United States Patent [19]

Betensky

[11] 4,304,466

[45] Dec. 8, 1981

[54] ZOOM LENS

[75] Inventor: Ellis Betensky, Tel Aviv, Israel

[73] Assignee: Vivitar Corporation, Santa Monica, Calif.

[21] Appl. No.: 71,131

[22] Filed: Sep. 6, 1979

Related U.S. Application Data

[63] Continuation-in-part of Ser. No. 941,517, Sep. 11, 1978, abandoned.

[51] Int. Cl.³ .............................................. G02B 15/14
[52] U.S. Cl. .................................................... 350/426
[58] Field of Search ...................... 350/184, 186, 426

[56] References Cited

U.S. PATENT DOCUMENTS

| 4,153,339 | 5/1979 | Tajima et al. | 350/184 |
| 4,189,212 | 2/1980 | Mizutani et al. | 350/184 |
| 4,195,912 | 4/1980 | Doi et al. | 350/184 |
| 4,198,128 | 4/1980 | Ogino | 350/184 |

Primary Examiner—John K. Corbin
Assistant Examiner—Scott J. Sugarman
Attorney, Agent, or Firm—DeLio and Montgomery

[57] ABSTRACT

An improved optical system for a relatively compact zoom lens of relatively high speed, moderate range, and extending from normal into the telephoto region, the lens being of simple construction and having two lens groups and as few as six elements.

14 Claims, 6 Drawing Figures

ZOOM LENS

This application is a continuation-in-part of Application Ser. No. 941,517, filed Sept. 11, 1978 now abandoned.

This invention relates to an improved variable equivalent focal length (EFL) optical system for a lens of relatively high speed, and range extending from normal into the telephoto region.

Many zoom or variable focal length lenses have been designed based on a classical telephoto construction. Lenses of this type usually comprise at least three groups and have typically in excess of ten elements. Prior constructions have a front group of positive power, which is followed by a moving negative power group having significant separation at the long focal length position, and a rear group which is often movable with the intermediate group. Attempts to simplify construction so as to reduce costs have not been consistent with obtaining a large zoom ratio while maintaining high image quality unless the numerical aperture is reduced significantly. Further, the attempted simplified lens designs have seldom resulted in relatively compact configurations which use inexpensive optical materials.

Zoom lenses have become popular as optical characteristics, image quality, and zoom ranges have improved. Such lenses are being used more frequently in place of single focal length lenses than just a few years ago. However, most of these zoom lens designs have moderate relative apertures which make the lenses less competitive in the existing market of accessory photographic equipment for cameras.

An optical system according to the present invention provides a compact zoom having a relative aperture of f/2.8 or faster, yet is of a simple form with as few as two basic groups and as few as six lens elements.

A construction of a preferred form consists of a negative group followed by a positive group. This order is the opposite order of usual long focus zoom lenses. Compactness of the lens construction is provided by having an absolute value focal length ratio of the absolute value of the first group to the second group of greater than 1.60 by utilizing only a thin doublet for the first group, and a telephoto objective for the second group. Compactness is aided in that the minimum front vertex distance (FVD) may be less than the maximum focal length.

An object of the present invention is to provide a new and improved zoom lens of moderate zoom range extending into the telephoto range, which lens is relatively compact and of relatively simple construction.

Another object of the invention is to provide a new and improved zoom lens of relatively simple construction having as few as two lens groups and as few as six elements, the first group being of negative power and the second group being of positive power.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

Figure 1:
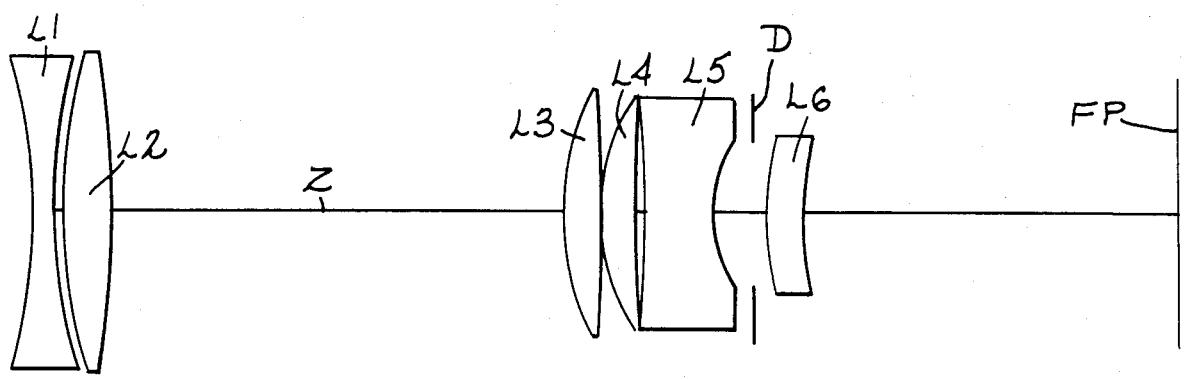
FIGS. 1 and 2 are diagrammatic side views of lenses embodying the invention, with elements in the widest angle positions.
Figure 1A:
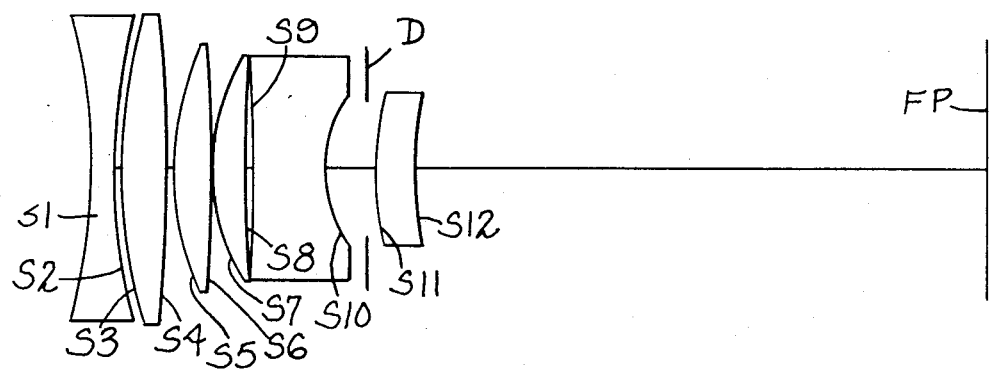
FIGS. 1a and 2a are diagrammatic side views of the lenses in the longest focal length position.

In the drawings, lens elements are identified by the reference L followed by an arabic numeral progressively from the object end toward the image end, and lens surfaces are identified by the reference R followed by an arabic numeral from the object end to the image end. Spacings which vary with EFL are indicated by the reference Z, and the film or focal plane is FP.

Referring to the drawings, a compact optical system for a zoom lens is shown. The lens is of a simple form having two groups which are relatively movable axially to vary the equivalent focal length (EFL) of the lens. The absolute value of the EFL of the first group $F_1$ is greater than the lower limit EFL of the lens. The groups are constructed so that the ratio of focal lengths of the respective groups $|F_1|/F_2$ is greater than 1.5. Also, the absolute value of the EFL provides for a degree of compactness unusual for a zoom lens of this focal length range and maximum relative aperture.

Figure 2:
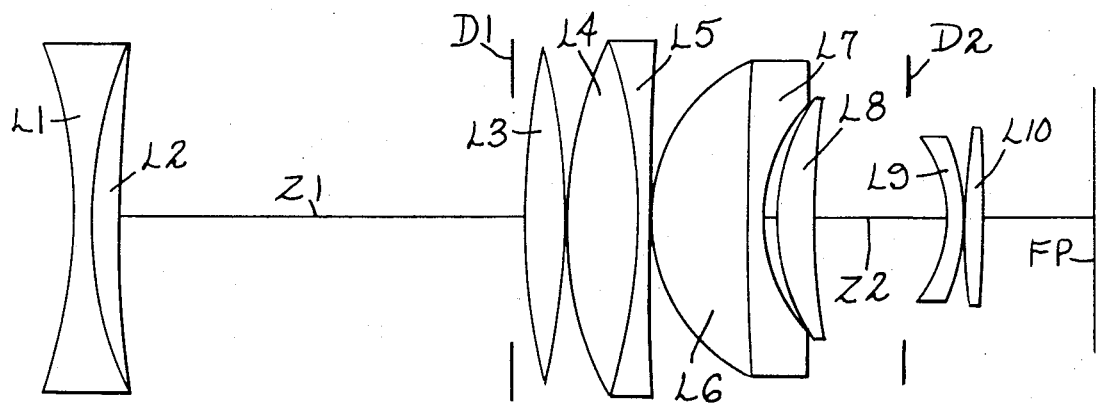

In a preferred embodiment shown in FIGS. 1 and 2, a simple construction is provided with only six elements. In FIG. 1, the lens is shown in its shorter EFL position and in FIG. 2 in its longer EFL position. The front group has negative power and is formed of a negative element L1 and a positive element L2. Although the order of positive to negative can be interchanged, retaining the negative element as the front element is preferred. The second or rear group is a simple four element group with the elements fixed together for movement relative to the front group and the image plane as the focal length of the lens is changed. In this embodiment, the zoom ratio of the lens is 2. Further, the shortest FVD is achieved at the long focal length position and is approximately equal to the focal length. The lens aperture at the shortest focal length is f/2.8.

The front group is formed of negative elements L1 and positive elements L2 respectively, which are corrected for optimum balance of distortion and astigmatism. The second group has positive power. The first and second elements L3, L4 of the second group are both positive with convex object side surfaces followed by a relatively thick negative element L5 and a positive meniscus element L6.

In this embodiment, the second group moves toward the object and as the first group moves toward the image as the EFL is increased, the front vertex distance (FVD) decreases with EFL. An aperture defining mechanism is located between elements L5 and L6 and moves with the rear positive group.

An embodiment of the lens as shown in FIGS. 1 and 2 is constructed as hereinafter described in Table I wherein radii, thickness, and spacing dimensions are set forth in millimeters, and the refractive indices for the helium line at 589.29 mm of the spectrum and the Abbe dispersion numbers for the optical materials are designated at $N_d$ and $V_d$ respectively. The same designations are used in Tables II–V.

A lens embodying the invention as scaled to an image frame of 24×36 mm, a 70 to 145 mm zoom range and subtending semi-field angles of 16.0° to 7.9° is set forth in Table I.

TABLE I

| Element | Radius of Curvature (mm) | Axial Distance Between Surfaces (mm) | $N_d$ | $V_d$ |
|---|---|---|---|---|
| L1 | R1 = −96.483 | | | |
|    |              | 3.80 | 1.815 | 43.2 |
|    | R2 = 93.362  |      |       |      |
|    |              | 1.13 |       |      |
| L2 | R3 = 94.885  |      |       |      |
|    |              | 7.96 | 1.674 | 31.9 |
|    | R4 = −225.454 |     |       |      |
|    |              | 2    |       |      |
| L3 | R5 = 48.984  |      |       |      |
|    |              | 6.08 | 1.700 | 54.7 |
|    | R6 = −350.307 |     |       |      |
|    |              | .30  |       |      |
| L4 | R7 = 36.342  |      |       |      |
|    |              | 5.31 | 1.675 | 48.4 |
|    | R8 = 277.063 |      |       |      |
|    |              | .76  |       |      |
| L5 | R9 = −1107.411 |    |       |      |
|    |              | 12.47 | 1.754 | 27.6 |
|    | R10 = 22.283 |      |       |      |
|    |              | 8.31 |       |      |
| L6 | R11 = 49.921 |      |       |      |
|    |              | 6.82 | 1.802 | 25.6 |
|    | R12 = 75.151 |      |       |      |

| GROUP SPACING | | | |
|---|---|---|---|
| EFL | Z | FVD | f/No. |
| 70.0mm | 75.92mm | 190.6mm | 2.8 |
| 92.0mm | 41.09 | 165.9 | 3.2 |
| 145.0mm | .50 | 149.8 | 4.0 |

To attain greater compactness and/or extended focal length range or aperture, a more complex lens form can be used. Particularly, the second group may be formed with positive and negative subgroups which move independently for zooming. Also, a secondary motion may be superimposed on the relatively simple motion of the second group to provide a more complex and compound movement resulting in still better optical corrections.

Figure 2A:
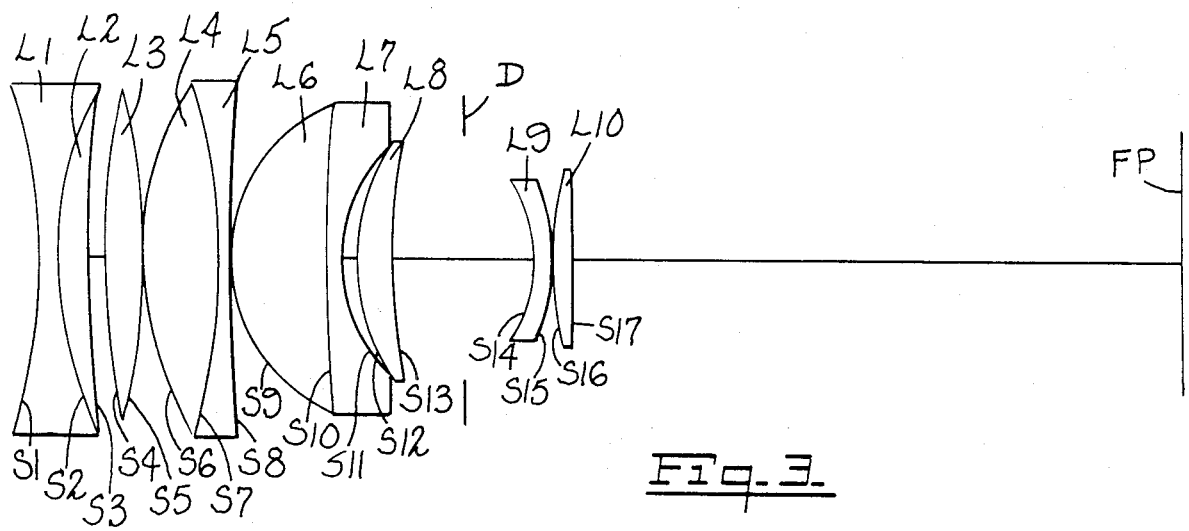

Another embodiment of the lens, as shown in FIGS. 2 and 2a, is a ten element form capable of the focal length being varied over a zoom range almost as great as 4:1.

The lens of FIGS. 2 and 2a has two groups. The first group is a doublet formed of a negative biconcave element L1 and a thin positive meniscus element L2, very slightly air spaced. This doublet is air spaced from the second group. In this space is positioned a first diaphragm stop D1.

The second group is formed as two subgroups which move in relation to each other for zooming. The first subgroup comprises a biconcave element L3 followed by a positive doublet formed of a thicker biconvex element L4 and a negative element L5. Thereafter, another thick doublet L6, L7, convex to the object, follows. The doublet L6, L7 is followed by a positive meniscus L7, convex to the object. This first subgroup is air spaced widely from the second subgroup which follows a second diaphragm stop located in the intermediate spacing. The second subgroup is of negative power with a negative meniscus L9, concave to the object, and a positive element L10.

In the embodiment shown in FIGS. 2–2a, the front group L1, L2 moves first toward the image end and then towards the object end as the EFL is varied from minimum to maximum. The second subgroup L9, L10 of the second group initially moves toward the image end but reverses motion toward the object end. In this embodiment, two aperture defining mechanisms are utilized. Mechanism D1 is located just before L3 and mechanism D2 is located between L8 and L9. At the longer EFL's, mechanism D2 determines the relative aperture.

Another lens as shown in FIGS. 2 and 2a scaled to an image frame of 24×36 mm, having EFL's of 50.0 mm to 192.0 mm, is substantially defined in Table II.

TABLE II

| Element | Radius of Curvature (mm) | Axial Distance Between Surfaces (mm) | $N_d$ | $V_d$ |
|---|---|---|---|---|
| L1 | R1 = −81.235 | | | |
|    |              | 2.50 | 1.729 | 53.4 |
|    | R2 = 64.727  |      |       |      |
|    |              | .19  |       |      |
| L2 | R3 = 64.688  |      |       |      |
|    |              | 4.50 | 1.813 | 25.3 |
|    | R4 = 230.458 |      |       |      |
|    |              | Z1   |       |      |
| L3 | R5 = 116.205 |      |       |      |
|    |              | 6.50 | 1.560 | 61.4 |
|    | R6 = −118.230 |     |       |      |
|    |              | .15  |       |      |
| L4 | R7 = 59.886  |      |       |      |
|    |              | 12.50 | 1.489 | 70.2 |
|    | R8 = −96.191 |      |       |      |
| L5 |              | 2.00 | 1.813 | 25.3 |
|    | R9 = 557.537 |      |       |      |
|    |              | .15  |       |      |
| L6 | R10 = 28.530 |      |       |      |
|    |              | 15.40 | 1.489 | 70.2 |
| L7 | R11 = 410.187 |     |       |      |
|    |              | 3.20 | 1.633 | 48.6 |
|    | R12 = 25.976 |      |       |      |
|    |              | 2.95 |       |      |
| L8 | R13 = 37.520 |      |       |      |
|    |              | 5.74 | 1.489 | 70.2 |
|    | R14 = 105.944 |     |       |      |
|    |              | Z2   |       |      |
| L9 | R15 = −19.584 |     |       |      |
|    |              | 2.33 | 1.614 | 59.5 |
|    | R16 = −40.587 |     |       |      |
|    |              | .20  |       |      |
| L10 | R17 = 103.944 |    |       |      |
|    |              | 3.76 | 1.792 | 25.5 |
|    | R18 = −781.970 |    |       |      |

| GROUP SPACING | | | | |
|---|---|---|---|---|
| EFL | Z1 | Z2 | FVD | f/No. tz,1/32 |
| 50.0mm | 67.831 | 22.834 | 172.1 | 4.0 |
| 75.0mm | 39.358 | 21.846 | 158.8 | 4.0 |
| 135.0mm | 12.593 | 22.208 | 167.0 | 4.0 |
| 192.0mm | 2.696 | 22.925 | 190.0 | 4.0 |

Another embodiment of the invention substantially as shown in FIGS. 2 and 2a scaled to an image frame of 24×36 mm, and EFL's of 76.5 mm to 192.1 mm is substantially defined in Table III.

TABLE III

| Element | Radius of Curvature (mm) | Axial Distance Between Surfaces (mm) | $N_d$ | $V_d$ |
|---|---|---|---|---|
| L1 | R1 = −88.100 | | | |
|    |              | 2.50 | 1.642 | 59.9 |
|    | R2 = 67.104  |      |       |      |
|    |              | .19  |       |      |
| L2 | R3 = 64.014  |      |       |      |
|    |              | 4.50 | 1.812 | 25.2 |
|    | R4 = 136.313 |      |       |      |
|    |              | Z    |       |      |
| L3 | R5 = 134.983 |      |       |      |
|    |              | 6.50 | 1.609 | 56.4 |
|    | R6 = −159.956 |     |       |      |
|    |              | .15  |       |      |
| L4 | R7 = 58.708  |      |       |      |
|    |              | 12.50 | 1.489 | 70.2 |
|    | R8 = −98.315 |      |       |      |
| L5 |              | 2.0  | 1.812 | 25.2 |
|    | R9 = 573.019 |      |       |      |
|    |              | .15  |       |      |

TABLE III-continued

| | | | | |
|---|---|---|---|---|
| L6 | R10 = 28.413 | 15.40 | 1.489 | 70.2 |
| | R11 = 335.947 | | | |
| L7 | | 3.20 | 1.646 | 47.6 |
| | R12 = 25.535 | | | |
| | | 2.95 | | |
| L8 | R13 = 35.799 | 5.74 | 1.489 | 70.2 |
| | R14 = 110.481 | | | |
| | | 6.02 | | |
| | Aperture | | | |
| | | 15.80 | | |
| L9 | R15 = −20.282 | 2.33 | 1.605 | 60.4 |
| | R16 = −40.780 | | | |
| | | .20 | | |
| L10 | R17 = 142.976 | 3.76 | 1.791 | 25.4 |
| | R18 = −296.675 | | | |
| | | 105.69 | | |

| | GROUP SPACING | | | |
|---|---|---|---|---|
| EFL | Z | FVD | f/No. | |
| 76.5mm | 44.107mm | 166.5m | 4.0 | |
| 129.2mm | 15.649 | 168.6 | 4.0 | |
| 192.0mm | 2.100 | 191.7 | 4.0 | |

Here the front group L1, L2 moves toward the object and with increasing EFL as does the second group L3-L10. An aperture defining mechanism is located between element L8 and L9 and moves with the second group.

Another embodiment of a lens embodying the invention substantially as shown in FIGS. 2 and 2a is set forth in Table IV. This lens differs in that element L8 is biconvex, as scaled to an image frame of 24×36 mm and EFL's of substantially 50 mm to 120 mm.

TABLE IV

| Element | Radius of Curvature (mm) | Axial Distance Between Surfaces (mm) | $N_d$ | $V_d$ |
|---|---|---|---|---|
| L1 | R1 = −65.1214 | 2.5000 | 1.633 | 53.5 |
| | R2 = 49.9779 | | | |
| | | .2000 | | |
| L2 | R3 = 49.7071 | 4.4988 | 1.803 | 26.0 |
| | R4 = 123.0426 | | | |
| | | Z = 30.02 to 1.0 | | |
| L3 | R5 = 95.5044 | 5.6086 | 1.720 | 50.4 |
| | R6 = −89.8393 | | | |
| | | .2000 | | |
| L4 | R7 = 51.9336 | 10.1667 | 1.487 | 70.4 |
| | R8 = −56.2006 | | | |
| L5 | R9 = 242.1799 | 2.0000 | 1.805 | 25.5 |
| | | .2000 | | |
| L6 | R10 = 35.4902 | 9.9112 | 1.505 | 60.6 |
| | R11 = −63.9444 | | | |
| L7 | R12 = 67.8449 | 2.0000 | 1.720 | 50.4 |
| | | 9.7716 | | |
| L8 | R13 = 89.2652 | 3.6997 | 1.531 | 51.3 |
| | R14 = −75.4657 | | | |
| | | 2.000 | | |
| | Aperture | | | |
| | | 24.2395 | | |
| L9 | R15 = −19.5383 | 1.5811 | 1.720 | 50.4 |
| | R16 = 211.1908 | | | |
| | | .2000 | | |
| L10 | R17 = 72.5994 | 8.000 | 1.805 | 25.5 |

TABLE IV-continued

| Element | Radius of Curvature (mm) | Axial Distance Between Surfaces (mm) | $N_d$ | $V_d$ |
|---|---|---|---|---|
| | R18 = −198.3869 | | | |
| BFL = 40.0mm | | | | |

Figure 3:
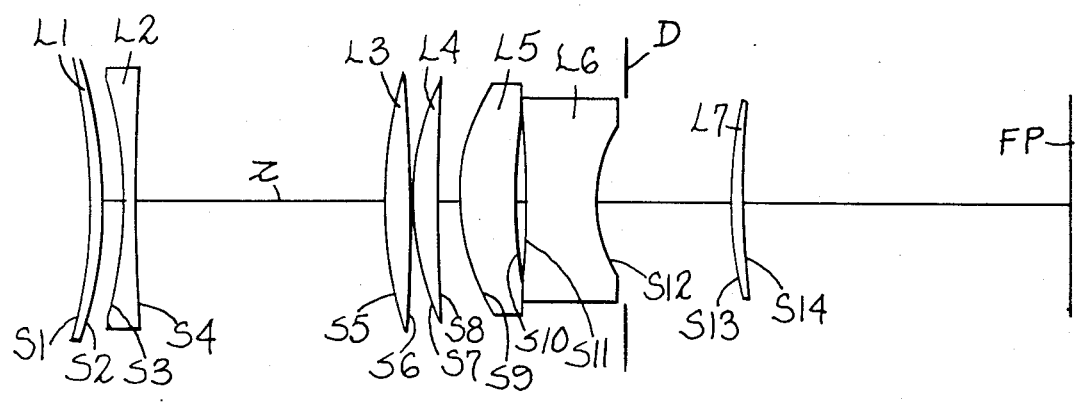
FIG. 3 is a diagrammatic side view of another lens embodying the invention with the elements thereof in a mid focal range position.

Still another embodiment is a seven element form in which a five element rear group is used, as shown in FIG. 3 in the mid-focal length position. This lens is scaled to an image frame of 24×36 mm, has EFL's of 70 to 145, and is substantially described in Table V.

TABLE V

| Element | Radius of Curvature (mm) | Axial Distance Between Surfaces (mm) | $N_d$ | $V_d$ |
|---|---|---|---|---|
| L1 | R1 = −96.5620 | 2.2900 | 1.847 | 23.8 |
| | R2 = −67.5590 | | | |
| | | 3.7200 | | |
| L2 | R3 = −64.8290 | 2.1500 | 1.697 | 55.5 |
| | R4 = 2317.6220 | | | |
| | | Z = 65.56 to .5 | | |
| L3 | R5 = 70.8430 | 4.2600 | 1.518 | 59.0 |
| | R6 = −258.1480 | | | |
| | | .5000 | | |
| L4 | R7 = 48.0200 | 3.9000 | 1.517 | 64.2 |
| | R8 = 204.8770 | | | |
| | | 3.3500 | | |
| | Aperture | | | |
| | | .5000 | | |
| L5 | R9 = 37.4330 | 9.2300 | 1.583 | 46.4 |
| | R10 = 200.0540 | | | |
| | | 1.0900 | | |
| L6 | R11 = 639.6840 | 12.0000 | 1.847 | 23.8 |
| | R12 = 23.1000 | | | |
| | | 21.7800 | | |
| L7 | R13 = 56.0900 | 2.2300 | 1.847 | 23.8 |
| | R14 = 138.5020 | | | |

Figure 4:
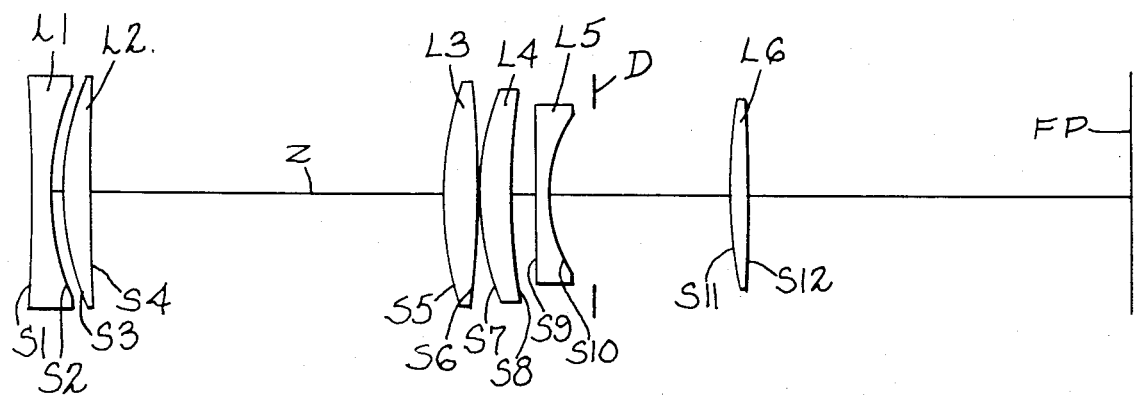
FIG. 4 is a diagrammatic side view of another six element lens embodying the invention with the elements thereof in the short focal range position.

Another six element embodiment of the lens is shown in FIG. 4 with the elements in the shortest focal length position. This lens, as scaled to an image frame of 24×36 mm, and having EFL's of 77 mm to 145 mm, is substantially defined in Table VI.

TABLE VI

| Element | Radius of Curvature (mm) | Axial Distance Between Surfaces (mm) | $N_d$ | $V_d$ |
|---|---|---|---|---|
| L1 | R1 = −246.583 | 3.000 | 1.806 | 40.7 |
| | R2 = 47.217 | | | |
| | | 2.199 | | |
| L2 | R3 = 49.870 | 4.110 | 1.728 | 28.3 |
| | R4 = 295.575 | | | |
| | | Z | | |
| L3 | R5 = 46.962 | 6.376 | 1.658 | 50.9 |
| | R6 = −299.223 | | | |
| | | 0.200 | | |
| L4 | R7 = 32.687 | 6.539 | 1.720 | 50.3 |
| | R8 = 98.647 | | | |
| | | 4.738 | | |
| L5 | R9 = plano | 2.500 | 1.805 | 25.5 |
| | R10 = 23.887 | | | |
| | | 4.000 | | |
| | Aperture | | | |
| | | 26.177 | | |
| | R11 = 91.566 | | | |

TABLE VI-continued

| | | | | |
|---|---|---|---|---|
| L6 | | 3.000 | 1.603 | 38.0 |
| | R12 = −276.325 | | | |

| | GROUP SPACING | | |
|---|---|---|---|
| EFL | Z | FVD | f/No. |
| 77.25mm | 62.39mm | 199.0 | 3.4 |
| 105.0 | 28.17 | 181.4 | 3.9 |
| 145.0 | 1.88 | 179.0 | 4.6 |

In the foregoing tables, $N_d$ is the index of refraction and $V_d$ (Abbe number) is the dispersion of the lens elements.

The powers of the first and second groups of the disclosed lens are set forth in Table VII.

TABLE VII

| Table | $F_1$ | $F_2$ | $|F_1|/F_2$ |
|---|---|---|---|
| I | −148.70mm | 68.79mm | 2.16 |
| II | −88.63 | 50.07 | 1.77 |
| III | −97.99 | 54.51 | 1.80 |
| IV | −77.55 | 32.05 | 2.42 |
| V | −140.25 | 70.13 | 2.00 |
| VI | −129.48 | 77.26 | 1.66 |

The absolute value of the EFL of the first group is always greater than the lower limit EFL of the lens, and the absolute value of the ratio $F_1/F_2$ is greater than 1.5 and less than 3.0.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A zoom lens having upper and lower limit equivalent focal lengths comprising from the object end, a first negative group and a second positive group, said groups being movable axially relative to each other to vary the equivalent focal length of the lens, the absolute value of the equivalent focal length of said first group $|F_1|$ being greater than the lower limit equivalent focal length of said lens, and $$3 > |F_1|/F_2 \geq 1.6$$

where $F_2$ is the equivalent focal length of said second group, the lower limit equivalent focal length of said lens being greater than the diagonal of the image frame of said lens, said first group consists of two elements, one of which is biconcave.

2. A zoom lens according to claim 1 where said first group consists of said biconcave element and a biconvex element.

3. A zoom lens according to claim 1 where said first group from the object end consists of said biconcave element and a positive meniscus concave to the object.

4. A zoom lens according to claim 1 where said first group from the object end consists of said biconcave element and a positive meniscus.

5. The zoom lens as in claim 1 wherein said second group comprises from the object end four elements, the first two of said elements being of positive power, followed by a negative element and finally a widely spaced positive element.

6. The zoom lens as in claim 1 wherein said second group comprises from the object end a singlet, a positive doublet, a thick long focal length meniscus doublet concave to the film plane, a meniscus singlet concave to the film plane, and a negative group widely separated from said meniscus singlet.

7. A zoom lens according to claim 1 where said second group comprises from the object end a bi-concave element, a bi-convex doublet, a positive doublet in the form of a meniscus convex to the object, a negative meniscus concave to the object, and a bi-convex element.

8. A zoom lens according to claim 2 where said second group consists from the object end of a bi-concave element, a positive meniscus convex to the object, a negative meniscus concave to the image, and a positive element convex to the object.

9. A lens according to claim 1 scaled to an image frame of 24×36 mm and an EFL of 70–145 mm substantially as follows:

| Element | Radius of Curvature (mm) | Axial Distance Between Surfaces (mm) | $N_d$ | $V_d$ |
|---|---|---|---|---|
| L1 | R1 = −96.483 | | | |
| | | 3.80 | 1.815 | 43.2 |
| | R2 = 93.362 | | | |
| | | 1.13 | | |
| L2 | R3 = 94.885 | | | |
| | | 7.96 | 1.674 | 31.9 |
| | R4 = −225.454 | | | |
| | | 2 | | |
| L3 | R5 = 48.984 | | | |
| | | 6.08 | 1.700 | 54.7 |
| | R6 = −350.307 | | | |
| | | .30 | | |
| L4 | R7 = 36.342 | | | |
| | | 5.31 | 1.675 | 48.4 |
| | R8 = 277.063 | | | |
| | | .76 | | |
| L5 | R9 = −1107.411 | | | |
| | | 12.47 | 1.754 | 27.6 |
| | R10 = 22.283 | | | |
| | | 8.31 | | |
| L6 | R11 = 49.921 | | | |
| | | 6.82 | 1.802 | 25.6 |
| | R12 = 75.151 | | | |

| | GROUP SPACING | | |
|---|---|---|---|
| EFL | Z | FVD | f/No. |
| 70.0mm | 75.92mm | 190.6mm | 2.8 |
| 92.0mm | 41.09 | 165.9 | 3.2 |
| 145.0mm | .50 | 149.8 | 4.0 | where L1-L6 are the lens elements from the object end to the image end, R1-R12 are the surfaces of elements L1-L6, $N_d$ is the index of refraction of the lens elements, $V_d$ is the dispersion of the lens elements as measured by the Abbe number, Z is a variable lens spacing, EFL is the equivalent focal length of the lens, FVD is the front vertex distance of the lens, and f/No. is the relative aperture of the lens.

10. A lens according to claim 1 scaled to an image frame of 24×36 mm and an EFL of 50–192 mm substantially as follows:

| Element | Radius of Curvature (mm) | Axial Distance Between Surfaces (mm) | $N_d$ | $V_d$ |
|---|---|---|---|---|
| L1 | R1 = −81.235 | | | |
| | | 2.50 | 1.729 | 53.4 |
| | R2 = 64.727 | | | |

-continued

| Element | Radius of Curvature | Axial Distance | $N_d$ | $V_d$ |
|---|---|---|---|---|
| | | .19 | | |
| | R3 = 64.688 | | | |
| L2 | | 4.50 | 1.813 | 25.3 |
| | R4 = 230.458 | | | |
| | | Z1 | | |
| | R5 = 116.205 | | | |
| L3 | | 6.50 | 1.560 | 61.4 |
| | R6 = −118.230 | | | |
| | | .15 | | |
| | R7 = 59.886 | | | |
| L4 | | 12.50 | 1.489 | 70.2 |
| | R8 = −96.191 | | | |
| L5 | | 2.00 | 1.813 | 25.3 |
| | R9 = 557.537 | | | |
| | | .15 | | |
| | R10 = 28.530 | | | |
| L6 | | 15.40 | 1.489 | 70.2 |
| | R11 = 410.187 | | | |
| L7 | | 3.20 | 1.633 | 48.6 |
| | R12 = 25.976 | | | |
| | | 2.95 | | |
| | R13 = 37.520 | | | |
| L8 | | 5.74 | 1.489 | 70.2 |
| | R14 = 105.944 | | | |
| | | Z2 | | |
| | R15 = −19.584 | | | |
| L9 | | 2.33 | 1.614 | 59.5 |
| | R16 = −40.587 | | | |
| | | .20 | | |
| | R17 = 103.944 | | | |
| L10 | | 3.76 | 1.792 | 25.5 |
| | R18 = −781.970 | | | |

| GROUP SPACING | | | | |
|---|---|---|---|---|
| EFL | Z1 | Z2 | FVD | f/No. |
| 50.0mm | 67.831 | 22.834 | 172.1 | 4.0 |
| 75.0mm | 39.358 | 21.846 | 158.8 | 4.0 |
| 135.0mm | 12.593 | 22.208 | 167.0 | 4.0 |
| 192.0mm | 2.696 | 22.925 | 190.0 | 4.0 | where L1-L10 are the lens elements from the object end to the image end, R1-R18 are the surfaces of elements L1-L10, $N_d$ is the index of refraction of the lens elements, $V_d$ is the dispersion of the lens elements as measured by the Abbe number, Z1 and Z2 are the variable lens spacings, EFL is the equivalent focal length of the lens, FVD is the front vertex distance of the lens, and f/No. is the relative aperture of the lens.

11. A lens according to claim 1 scaled to an image frame of 24×36 mm and an EFL of 76.5-192.1 mm substantially as follows:

| Element | Radius of Curvature (mm) | Axial Distance Between Surfaces (mm) | $N_d$ | $V_d$ |
|---|---|---|---|---|
| L1 | R1 = −88.100 | 2.50 | 1.642 | 59.9 |
| | R2 = 67.104 | | | |
| | | .19 | | |
| | R3 = 64.014 | | | |
| L2 | | 4.50 | 1.812 | 25.2 |
| | R4 = 136.313 | | | |
| | | Z | | |
| | R5 = 134.983 | | | |
| L3 | | 6.50 | 1.609 | 56.4 |
| | R6 = −159.956 | | | |
| | | .15 | | |
| | R7 = 58.708 | | | |
| L4 | | 12.50 | 1.489 | 70.2 |
| | R8 = −98.315 | | | |
| L5 | | 2.0 | 1.812 | 25.2 |
| | R9 = 573.019 | | | |
| | | .15 | | |
| | R10 = 28.413 | | | |
| L6 | | 15.40 | 1.489 | 70.2 |
| | R11 = 335.947 | | | |
| L7 | | 3.20 | 1.646 | 47.6 |
| | R12 = 25.535 | | | |
| | | 2.95 | | |
| | R13 = 35.799 | | | |
| L8 | | 5.74 | 1.489 | 70.2 |
| | R14 = 110.481 | | | |
| | | 6.02 | | |
| | Aperture | | | |
| | | 15.80 | | |
| | R15 = −20.282 | | | |
| L9 | | 2.33 | 1.605 | 60.4 |
| | R16 = −40.780 | | | |
| | | .20 | | |
| | R17 = 142.976 | | | |
| L10 | | 3.76 | 1.791 | 25.4 |
| | R18 = −296.675 | | | |
| | | 105.69 | | |

| GROUP SPACING | | | |
|---|---|---|---|
| EFL | Z | FVD | f/No. |
| 76.5mm | 44.107mm | 166.5m | 4.0 |
| 129.2mm | 15.649 | 168.6 | 4.0 |
| 192.0mm | 2.100 | 191.7 | 4.0 | where L1-L10 are the lens elements from the object end to the image end, R1-R18 are the surfaces of elements L1-L10, $N_d$ is the index of refraction of the lens elements, $V_d$ is the dispersion of the lens elements as measured by the Abbe number, Z1 is a variable lens spacing, EFL is the equivalent focal length of the lens, FVD is the front vertex distance of the lens, and f/No. is the relative aperture of the lens.

12. A lens according to claim 1 scaled to an image frame of 24×36 mm and an EFL of 50-120 mm substantially as follows:

| Element | Radius of Curvature (mm) | Axial Distance Between Surfaces (mm) | $N_d$ | $V_d$ |
|---|---|---|---|---|
| L1 | R1 = −65.1214 | 2.5000 | 1.633 | 53.5 |
| | R2 = 49.9779 | | | |
| | | .2000 | | |
| | R3 = 49.7071 | | | |
| L2 | | 4.4988 | 1.803 | 26.0 |
| | R4 = 123.0426 | | | |
| | | Z = 30.0 to 1.0 | | |
| | R5 = 95.5044 | | | |
| L3 | | 5.6086 | 1.720 | 50.4 |
| | R6 = −89.8393 | | | |
| | | .2000 | | |
| | R7 = 51.9336 | | | |
| L4 | | 10.1667 | 1.487 | 70.4 |
| | R8 = −56.2006 | | | |
| L5 | | 2.0000 | 1.805 | 25.5 |
| | R9 = 242.1799 | | | |
| | | .2000 | | |
| | R10 = 35.4902 | | | |
| L6 | | 9.9112 | 1.505 | 60.6 |
| | R11 = −63.9444 | | | |
| L7 | | 2.0000 | 1.720 | 50.4 |
| | R12 = 67.8449 | | | |
| | | 9.7716 | | |
| | R13 = 89.2652 | | | |
| L8 | | 3.6997 | 1.531 | 51.3 |
| | R14 = −75.4657 | | | |
| | | 2.000 | | |
| | Aperture | | | |
| | | 24.2395 | | |
| | R15 = −19.5383 | | | |
| L9 | | 1.5811 | 1.720 | 50.4 |
| | R16 = 211.1908 | | | |
| | | .2000 | | |
| | R17 = 72.5994 | | | |
| L10 | | 8.000 | 1.805 | 25.5 |
| | R18 = −198.3869 | | | |

BFL = 40.0mm where L1–L10 are lens elements from the object end to the image end, R1–R18 are the surfaces of elements L1–L10, $N_d$ is the index of refraction of the lens elements, $V_d$ is the dispersion of the lens elements as measured by the Abbe number, and Z denotes a space which varies with change in equivalent focal length.

13. A lens according to claim 1 scaled to an image frame of 24×36 mm and an EFL of 70 to 145 substantially as follows:

| Element | Radius of Curvature (mm) | Axial Distance Between Surfaces (mm) | $N_d$ | $V_d$ |
|---|---|---|---|---|
| L1 | R1 = −96.5620 | | | |
| | | 2.2900 | 1.847 | 23.8 |
| | R2 = −67.5590 | | | |
| | | 3.7200 | | |
| | R3 = −64.8290 | | | |
| L2 | | 2.1500 | 1.697 | 55.5 |
| | R4 = 2317.6220 | | | |
| | | Z = 65.56 to .5 | | |
| | R5 = 70.8430 | | | |
| L3 | | 4.2600 | 1.518 | 59.0 |
| | R6 = −258.1480 | | | |
| | | .5000 | | |
| | R7 = 48.0200 | | | |
| L4 | | 3.9000 | 1.517 | 64.2 |
| | R8 = 204.8770 | | | |
| | | 3.3500 | | |
| | Aperture | | | |
| | | .5000 | | |
| | R9 = 37.4330 | | | |
| L5 | | 9.2300 | 1.583 | 46.4 |
| | R10 = 200.0540 | | | |
| | | 1.0900 | | |
| | R11 = 639.6840 | | | |
| L6 | | 12.0000 | 1.847 | 23.8 |
| | R12 = 23.1000 | | | |
| | | 21.7800 | | |
| | R13 = 56.0900 | | | |
| L7 | | 2.2300 | 1.847 | 23.8 |
| | R14 = 138.5020 | | | | where L1–L7 are lens elements from the object end to the image end, R1–R14 are the surfaces of elements L1–L10, $N_d$ is the index of refraction of the lens elements, $V_d$ is the dispersion of the lens elements as measured by the Abbe number, and Z denotes a space which varies with change in equivalent focal length.

14. A lens according to claim 1 scaled to an image frame of 24×36 mm and an EFL of 77–145 mm substantially as follows:

| Element | Radius of Curvature (mm) | Axial Distance Between Surfaces (mm) | $N_d$ | $V_d$ |
|---|---|---|---|---|
| L1 | R1 = −246.583 | | | |
| | | 3.000 | 1.806 | 40.7 |
| | R2 = 47.217 | | | |
| | | 2.199 | | |
| | R3 = 49.870 | | | |
| L2 | | 4.110 | 1.728 | 28.3 |
| | R4 = 295.575 | | | |
| | | Z | | |
| | R5 = 46.962 | | | |
| L3 | | 6.376 | 1.658 | 50.9 |
| | R6 = −299.223 | | | |
| | | 0.200 | | |
| | R7 = 32.687 | | | |
| L4 | | 6.539 | 1.720 | 50.3 |
| | R8 = 98.647 | | | |
| | | 4.738 | | |
| | R9 = plano | | | |
| L5 | | 2.500 | 1.805 | 25.5 |
| | R10 = 23.887 | | | |
| | | 4.000 | | |
| | Aperture | | | |
| | | 26.177 | | |
| | R11 = 91.566 | | | |
| L6 | | 3.000 | 1.603 | 38.0 |
| | R12 = −276.325 | | | |

| | GROUP SPACING | | | |
|---|---|---|---|---|
| EFL | Z | | FVD | f/No. |
| 77.25mm | 62.39mm | | 199.0 | 3.4 |
| 105.0 | 28.17 | | 181.4 | 3.9 |
| 145.0 | 1.88 | | 179.0 | 4.6 | where L1–L7 are lens elements from the object end to the image end, R1–R14 are the surfaces of elements L1–L7, $N_d$ is the index of refraction of the lens elements, $V_d$ is the dispersion of the lens elements as measured by the Abbe number, and Z denotes a space which varies with change in equivalent focal length.

* * * * *

UNITED STATES PATENT AND TRADEMARK OFFICE
CERTIFICATE OF CORRECTION

PATENT NO. : 4,304,466
DATED : December 8, 1981
INVENTOR(S) : Ellis Betensky

It is certified that error appears in the above-identified patent and that said Letters Patent are hereby corrected as shown below:

Column 3, Line 10, under heading "Axial Distance between Surfaces (mm)" of Table I: Change "2" to read -- Z --.

Column 4, Line 40, below Table II, under heading "Group Spacing" next to subheading "f/no.": Delete "tz,1/32".

Column 5, Line 27, first word: Delete "and" and substitute therefor: -- end --.

Column 8, Line 33, Claim 9, under heading "Axial Distance Between Surfaces (mm)": Change "2" to read -- Z --.

Signed and Sealed this

Twenty-ninth Day of June 1982

[SEAL]

Attest:

GERALD J. MOSSINGHOFF

Attesting Officer    Commissioner of Patents and Trademarks